United States Patent [19]

Howell

[11] 4,431,227

[45] Feb. 14, 1984

[54] RAILWAY FRICTION WHEEL

[76] Inventor: William B. Howell, 14652 W Valdon Rd., Mundelein, Ill. 60060

[21] Appl. No.: 361,400

[22] Filed: Mar. 24, 1982

[51] Int. Cl.³ .................... B60B 17/00; B60B 39/00; B61C 15/08
[52] U.S. Cl. .................... 295/33; 104/1 A; 105/73; 295/7; 295/31 R
[58] Field of Search .......... 295/1, 3, 4, 7, 11, 295/31 R, 31 A, 33, 34; 104/1 A; 105/73

[56] References Cited

U.S. PATENT DOCUMENTS

| | | | |
|---|---|---|---|
| 257,523 | 5/1982 | Snyder et al. | 301/51 |
| 489,496 | 1/1893 | Parmelee | 295/34 X |
| 781,572 | 1/1905 | Todd | 301/51 |
| 870,163 | 11/1907 | Glasscock | 301/45 |
| 1,253,722 | 1/1918 | Priel | 301/51 |
| 1,336,149 | 4/1920 | Nelson et al. | 302/51 X |
| 1,522,332 | 1/1925 | Schmitz | 295/31 R |
| 1,797,545 | 3/1931 | Churcher | 295/31 R |
| 2,034,816 | 3/1936 | Huguenin | 295/31 R |
| 2,190,142 | 2/1940 | Ansel | 152/208 |
| 2,877,716 | 3/1959 | Ryznar | 295/31 R |
| 3,120,255 | 2/1964 | Coppola | 152/208 |
| 3,174,804 | 3/1965 | Podger | 301/51 |
| 3,913,982 | 10/1975 | Brewer | 301/45 |
| 4,119,132 | 10/1978 | Ries | 152/208 |
| 4,310,191 | 1/1982 | Halldin | 295/31 R |

Primary Examiner—Robert B. Reeves
Assistant Examiner—Howard Beltran
Attorney, Agent, or Firm—Edward D. Gilhooly

[57] ABSTRACT

Method and device for enhancing the adhesion qualities of vehicle wheels through the use of a plurality of embedded members having exposed high frictional surfaces, which are capable of automatically being caused to attain frictional contact with a wheel bearing surface in response to slippage. Under normal conditions where enhanced friction is not needed, the embedded members lie in a relative retracted position from which they may respond to slippage conditions as needed.

11 Claims, 4 Drawing Figures

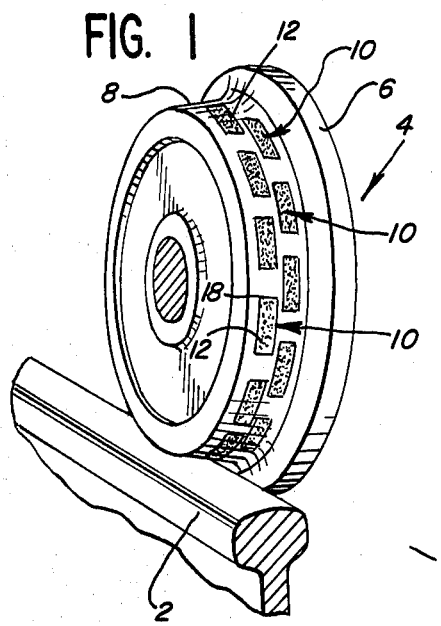
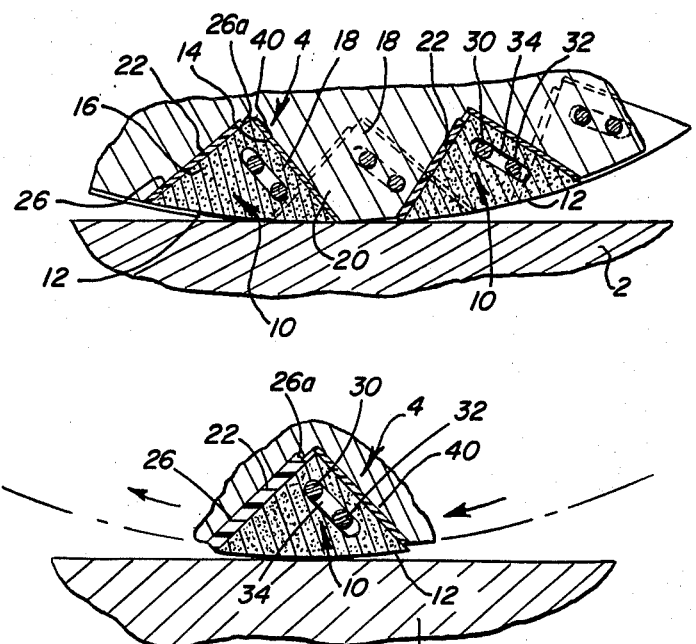
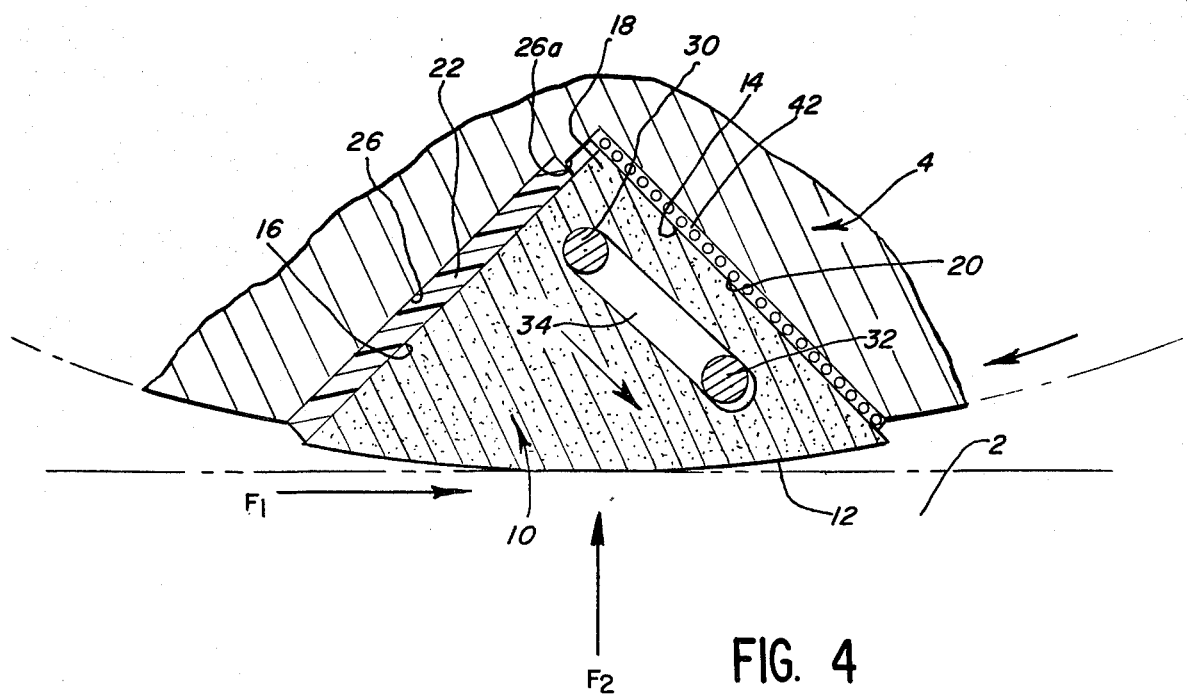

RAILWAY FRICTION WHEEL

BACKGROUND OF THE INVENTION

This invention relates in general to vehicles and, in particular, to device to enhance wheel adhesion.

More specifically, but without restriction to the particular use which is shown and described, this invention relates to a device and method for enhancing the adhesion qualities of vehicle wheels through the use of a plurality of embedded members having exposed high frictional surfaces, which are capable of automatically being caused to attain frictional contact with a wheel bearing surface in response to slippage. Under normal conditions where enhanced friction is not needed, the embedded members lie in a relative retracted position from which they may respond to slippage conditions as needed.

In many forms of vehicles, attainment of suitable traction of wheels under a wide range of varying conditions has been a long felt problem. In particular, railroad wheels have traditionally been subject to slippage during acceleration or braking, due to the low coefficient of adhesion or friction, which typically exists between the steel wheel and the steel rail. The coefficient of adhesion of railroad wheels may be as low as 0.3 or less, which means that the pulling power of a towing vehicle is limited to a magnitude about 0.3 times the weight of the vehicle. To sustain loads greater than that amount, steel wheels will inherently slip on the track surface. For many years, sand has been a commonly used agent to increase the frictional characteristics of railroad wheels, but this technique only slightly enhances traction and produces only minimal benefits.

Recently, numerous attempts have been made to increase the adhesion coefficient of a steel wheel through chemical means, since sand only offers a partial solution to the slippage problem. Such chemical techniques often involve the treatment of metal surfaces with numerous materials which increase frictional contact between wheel and rail. Examples of chemical or metallurgical means to increase friction are disclosed in U.S. Pat. No. 2,877,716 to Ryznar and U.S. Pat. No. 4,310,191 to Halidin. Even though the incorporation of frictional materials into a wheel thread inherently increases frictional characteristics, this technique of solving the problem of wheel slippage has not attained ideal results. In the case of a rail wheel, a frictional material embedded in its periphey tends to abrade the steel rail. Further, it seems that a proper functioning frictional material advantageously should be composed of a matrix which sloughs the worn abrasive particles at the proper time in order to be effective. However, such programmed wearing away of the frictional material is simply not suitable in a railroad environment.

Efforts have been made in the prior art to reduce slippage of a vehicle wheel by a host of other techniques, including the employment of rigidly or resiliently mounted lugs, spikes or feet of various types that are constantly driven in contact with the wheel bearing support surface. The constant contact of devices with the road is an obvious disadvantage due to inefficiency of vehicle operation and the like. Further, with regard to the devices digging into the ice, snow, sand, earth or other soft surfaces, the traction is not attained, strictly speaking, by friction. In addition, where friction is involved, these devices only increase frictional contact in accordance with the force exerted by the springs or various devices. Accordingly, no satisfactory technique has been developed by which the adhesion characteristics of a vehicle wheel, whether a steel rail wheel, a pneumatic tire, and the like, can be enhanced for greater traction during acceleration and braking of a vehicle under a wide range of loading conditions.

SUMMARY OF INVENTION

It is, therefore, an object of this invention to enhance the adhesion characteristics of vehicle wheels.

Another object of this invention to enhance the traction of a vehicle wheel through the use of a frictional material which does not serve as a fixed operative part of the tread.

A further object of this invention is to provide a friction enhancing device for a vehicle wheel which is responsive to actual conditions to enhance frictional contact.

Still another object of this invention is to provide one or more wedge elements which are automatically responsive to wheel slippage for limited movement from a position within the wheel to a position to increase frictional contact.

These and other objects are attained in accordance with the present invention wherein there is provided device for enhancing frictional characteristics of vehicle wheels and having a frictional material of any suitable form exposed on the external surface of one or wedge elements. The wedge elements are mounted for limited movement within an associate cavity arranged on the tread of the vehicle wheel. Each wedge is adapted to move along a bearing surface within the cavity in response to a slippage force dictating the necessity of additional frictional contact of the wheel. Extended movement of the wedge element causes the frictional material thereof to press against the support surface or track under the full weight upon the wheel. When slippage of the wheel is not encountered, the wedges retract into the cavities within the periphery with reduced contact with the wheel bearing surface. The plurality of wedges are arranged around the tread of the wheel in any selected pattern in a manner that enhanced traction characteristics are acheived.

DESCRIPTION OF THE DRAWINGS

Further objects of the invention together with additional features contributing thereto and advantages accruing therefrom will be apparent from the following description of preferred embodiments of the invention, which are shown in the accompanying drawings, with like reference numerals indicating corresponding parts throughout, wherein:

FIG. 1 is a perspective view of a railroad wheel bearing against a track and employing the friction enhancing devices of the invention;

FIG. 2 is a partial schematic side view, with parts in section, of the wheel of FIG. 1 in a stationary condition;

FIG. 3 is a partial schematic side view, with parts in section, of the wheel of FIG. 1 in a moving condition; and FIG. 4 is an enlarged partial schematic view, with parts in section, of a modified friction enhancing device of the invention.

DESCRIPTION OF PREFERRED EMBODIMENTS

Although the invention herein described is not intended to be so limited and may be employed with other vehicles, for convenience of illustration, the frictional enhancing device of the application is disclosed with reference to the environment of railroad wheels operating on a typical steel track. In FIG. 1, there is illustrated a steel rail 2 having a upper bearing surface to support a steel railway wheel 4. The wheel 4 possesses a well known configuration including a flange 6 and a rail bearing peripherial tread or perimeter 8.

As shown in FIG. 1, the rail wheel 4 is shown having a plurality of block members 10 in the form of an approximate wedge shape arranged into two rows continuously extending around the periphery 8 of wheel 4. It is within the scope of the invention to situate the wedge members 10 in other arrangements other than shown in FIG. 1, such as, for example, in one row, or more than two rows, in other symmetrical or nonsymmetrical patterns, and in suitable numbers to accomplish enhanced frictional contact between wheel and rail, in accordance with encountered conditions and design considerations.

As shown in FIGS. 2 to 4, each of the members 10 include a wedge-like cross sectional configuration in a plane substantially perpendicular to the axis of rotation of the wheel 4. The outer surface 12 of the members 10 is preferably in the form of arcuate face or segment to conform approximately to the curvature of the wheel 4 at its tread 8. In addition, wedges 10 possess a pair of interior surfaces 14 and 16 which are shown as flat, although they may have a curvature, particularly face 16, if suitable. The wedge members 10 are suitably mounted within cavities 18 having a slightly larger size, but similar shape as the members 10 to permit limited movement of the wedge members therein in a manner as will be described.

Each wedge member may be formed of a suitable metal material on which an appropriate frictional material is embedded or otherwise incorporated in the member to provide a high frictional surface on the exposed face of outer surface 12. Any well known type of frictional material may be utilized and may be, for example, the type of substances commonly employed in heavy duty brakes and clutches, or more commonly, employed as abrasives. In these situations, it may be appropriate to produce these materials by powder technology and sintering. Brake and clutch material providing high frictional characteristics include various metallic and graphite ingredients.

It is also within the scope of the invention to use other suitable substances to provide a frictional surface at face 12, such as, for example, industrial diamonds or cermets, which are commonly used for frictional material and abrasives. Among the cermets which are capable of being used in the invention are oxides of aluminium and silicon, the carbides of silicon and titanium, and the borides of nitrogen and carbon. The foregoing materials are not intended to be comprehensive list and are only offered as examples of suitable materials to be employed. It is within the scope of the invention to use countless other substances which effectively could act as a frictionalizing agent on the exposed surfaces 12 of wedges 10.

Each wedge member 10 is mounted for limited movement on surface 14 along an interior sliding surface formed on a wall 20 of its associated cavity 18. Such movement in induced by the presence or absence of slippage of the wheel during movement. The angle between the plane of sliding surface 20 and the radius of the wheel 4 is selected to be of a magnitude to cause the wedge 10 to attain an outward and/or extended position in the cavity 19 when slippage is encountered, but only then. Otherwise, the wedges 10 are forced back into the cavities into a retracted position against only a moderate force due to compression of a elastomeric material 22, so that less wear of the rails and frictional material occurs. As is apparent in FIGS. 2 and 3, the elastomeric material 22 is situated between a wall 26 forming cavity 18 and the interior face 16 of wedge 10. Alternatively, suitable spring members (not shown) may be utilized in place of a elastomeric material. In FIG. 4 a shoulder 26a is provided on the wall 26 to limit the amount of compression of the resilient member 22.

The wedges 10 are properly mounted within the each of the cavities 18 by the use of a fixed pair of spaced shafts 30 and 32 which are situated in an elongated slot 34 provided in each of the wedges. The relative spacing of the two shafts permits limited outward and inward movement of wedge 14 between the fully retracted and fully extended position. In FIG. 2 where the wheel is shown stationary, the upper two wedges 10 (one shown in phantion) are in a fully retracted position due to the weight on the wheel, at which position the material 22 is compressed. The latter conditions would similarly exist whether the wheel 4 is stationary or moving without slippage. In FIG. 3 the outward, fully extended position of the wedge to enhance friction is illustrated. The wedges 10 are induced to their extended positions as shown in FIG. 3 by the slippage forces as encountered.

Referring now to FIG. 4, the forces which act to cause the wedge to move to its extended position and creating increased frictional contact with the steel rail are shown. Force $F_2$ is the force of the rail 2 against the wedge 10, which is equal to and opposite from the weight exerted on the rail. Force $F_1$ is the force of friction exerted against the wedge 10 by rail 2 and at its maximum is equal to force $F_1$ times the coefficient of adhesion. When the wheel 4 is simply rolling on rail 2, force $F_1$ is zero, so $F_2$ pushes the wedge 10 into the wheel cavity in a manner as shown in FIG. 2. But as the wheel 4 attempts to slip against the rail 2, its encounters friction from the frictional material of the wedge 10 at its external face. This force drives the wedge 10 down the sliding surface and out of the cavity a sufficient distance for the frictional material to maintain contact with the rail and increase traction for acceleration or braking. It should be apparent to one skilled in the art that the wedge 10 and cavity 18 would be oriented in the opposite direction than shown in FIGS. 2 to 4 when aiding braking. The angle between the sliding surface and the radius of the wheel is a function of the coefficient of friction and may be approximately sixty degrees in some situations, although other angles may be approrpiate under various conditions, such as the actual amount of the coefficient of adhesion and the like.

In FIGS. 2 and 3 the sliding surface 20 is provided with a layer 40 of low frictional material of any suitable kind to increase the ability of the wedge 10 to move between its retracted and extended position during operation, as the wedge slides in contact therewith in altering its position in the cavity. Alternatively, typical rolling bearings 42 may be imposed between the cavity wall 22 and the wedge surface 14 to reduce frictional contact as illustrated in FIG. 4.

In the foregoing description the invention of the application was described for use in the railroad environment. As stated previously the invention may also be used in pheumatic tires employed similar devices as previously described, or studs and like constructed in accordance with the teachings herein. The teachings herein may be also used with construction and agriculture machinery, and the like as is appropriate.

While the invention has been described with reference to preferred embodiments, it will be understood by those skilled in the art that various changes may be made and equivalents may be substitute for elements thereof without departing from the scope of the invention. In addition, many modification may be made to adapt a particular situation or material to the teachings of the invention without department from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A device for enhancing frictional contact between a wheel and a supporting surface comprising:
    a wheel having a surface contacting periphery, said wheel having a plurality of cavities opening in said periphery,
    a plurality of friction enhancing members mounted for limited movement along a bearing surface provided within respective ones of said plurality of cavities between a retracted position and an extended position relative to said periphery;
    each of said friction enhancing members having an exposed frictional surface adapted to engage the supporting surface and a sliding surface mounted adjacent said bearing surface;
    means mounting said friction enhancing members within said cavities for movement to said extended position in response to slippage of said frictional surface on said supporting surface, said slippage between said frictional surface and the supporting surface acting to cause outward movement of said sliding surface along said bearing surface to said extended position, said frictional surface increasing frictional contact between said frictional surface and the supporting surface in said extended position, and said members being arranged for movement back into retracted position when said slippage is generally arrested.

2. The device according to claim 1 further including friction reducing means imposed between said members and said sliding surface.

3. The device according to claim 1 further including a compressible material imposed between said members and a second surface forming a wall of said cavity.

4. The device of claim 1 wherein said members include a configuration in the form of an approximate wedge.

5. The device according to claim 1 further including shaft means mounting said members in said cavities.

6. The device according to claim 5 wherein said shaft means is positioned within an elongated slot formed in said members.

7. A device for enhancing the frictional characteristics of a peripheral surface of a wheel comprising:
    an approximate wedge member having a pair of intersecting surface adapted to be in operative contact with walls forming an exposed cavity in the wheel;
    one of said surfaces of said wedge member arranged to move along one of said walls between a retracted and extended position;
    said wedge having an arcuate third surface formed with a friction enhancing material to contact a support surface on which said peripheral wheel surface is adapted to travel,
    said actuate surface acting to apply a force to said wedge in response to slippage between the arcuate surface and the support surface; and means for mounting said wedge member in said cavity for said movement along said one of said intersecting surfaces so as to be urged to said extended position in automatic response to the force applied to said wedge during said slippage of the wheel, said movement to said extended position causing said arcuate friction enhancing surface to increase engagement with the support surface, said wedge being caused to assume said retracted position in absence of slippage.

8. The device according to claim 7 further including means for creating a low frictional surface to enhance movement along one of said surfaces.

9. The device according to claim 7 further including compressible means situated adjacent the other of said pair of surfaces to aid in movement of said wedge member.

10. A method of enhancing the coefficient of adhesion of a vehicle wheel comprising the steps of providing at least one approximate wedge member in a cavity exposed in the peripheral surface of the wheel;
    exposing a frictional material on the exterior surface of said member adjacent the peripheral surface of said wheel,
    causing said member to move into a retracted position within the cavity upon contact of said exterior surface with a support surface in absence of slippage of the wheel therewith,
    applying a reactive force to said member by the frictional material of said wheel slipping on the support surface,
    arranging an internal surface to define a part of said cavity to apply a resultant force on said member to cause movement along said internal surface in response to application of said reactive force, and
    causing said member to move in response to said resultant force from said retracted position along said internal surface in said cavity and apply increased frictional contact between said exterior surface and said support surface in response to the forces generated by slippage of the wheel.

11. The method according to claim 10 wherein said step of providing at least one member in said cavity includes the step of providing a plurality of said members in respective plural cavities.

* * * * *